April 26, 1932. T. E. FORSTER 1,855,548
MIXING MACHINE
Filed May 22, 1931
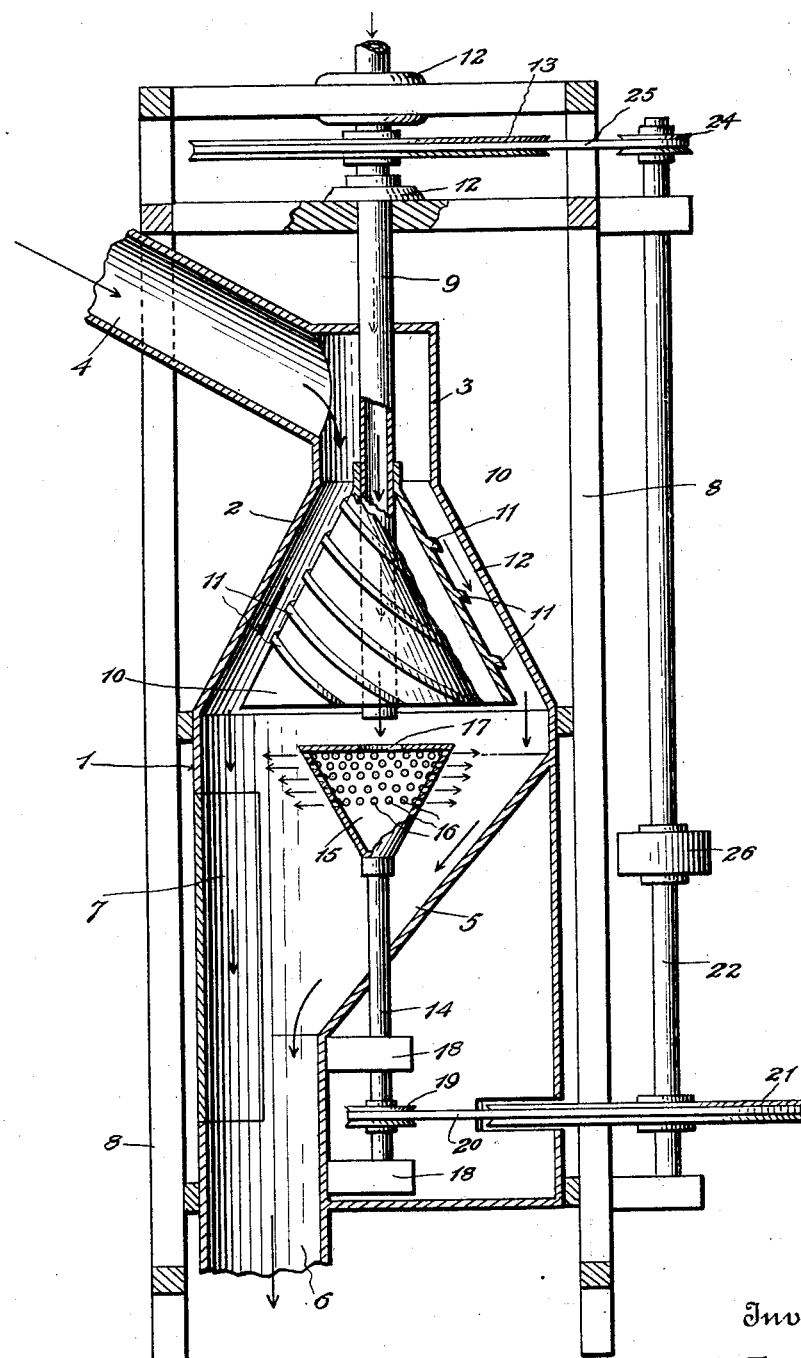
Inventor
Thomas E. Forster
By H. B. Willson &co
Attorneys.
Witness
C. E. Hunt Patented Apr. 26, 1932

1,855,548

UNITED STATES PATENT OFFICE

THOMAS E. FORSTER, OF WICHITA, KANSAS

MIXING MACHINE

Application filed May 22, 1931. Serial No. 539,387.

The invention aims to provide a new and improved machine designed primarily for spraying sorghum or other fluids upon stock feed or other loose material. Present methods of mixing molasses or other liquids with loose feed, require a great deal of power, especially when using the system known as the "cold molasses process". In this process, the molasses or sorghum is applied cold and the material is mixed at a sufficiently high speed to create heat by friction to thin the molasses or the like and insure even mixing. This method requires an unusual expenditure of power necessarily accompanied by expense, but the present machine insures an equally intimate mixture with the expenditure of an extreme minimum of power.

The accompanying drawing illustrates a vertical sectional view partly in elevation, of a mixing machine constructed in accordance with the invention.

The machine embodies a vertically elongated casing 1 preferably having a frusto-conical upper end 2 provided with a cylindrical cap 3 into which a chute 4 for loose feed or the like, discharges. The lower portion of the casing is provided with a hopper-like formation 5 declining to an outlet 6 for the mixed material, and a door 7 is preferably provided to give access to the interior of the casing whenever desired. The entire casing may be suitably secured to a supporting frame-work 8 and this frame-work in the present disclosure, carries bearings for rotary shafts hereinafter described.

An upper vertical tubular shaft 9 extends downwardly into the casing 1 and is provided at its lower end with a substantially conical spreader 10 disposed within the conical casing portion 2, said spreader receiving the loose material from the chute 4 and being provided with flights 11 to so distribute said material about the spreader as to cause the material to descend in a curtain-like formation from the lower end of the spreader. The shaft 9 is rotatably mounted in appropriate bearings 12 and is provided with a driving pulley 13. In the present showing, this shaft conducts the molasses or the like to be sprayed upon the descending loose material and hence the upper end of said shaft may be suitably coupled to a supply line for the fluid (not shown) or may be provided with means allowing the fluid to be poured into the shaft.

A lower vertical shaft 14 extends upwardly through the hopper-like portion 5 of the casing 1 and is axially alined with the shaft 9, the upper end of said shaft 14 being provided with an inverted conical spray head 15 perforated at 16 to radially deliver molasses or other fluid under the action of centrifugal force. The shaft 9, in the present showing, extends into close proximity with the upper end of the spray head 15 and the latter is formed with an opening 17, said shaft 9 discharging the molasses or the like through said opening into said spray head. The radially delivered fluid is thrown against the descending "curtain" of loose material which drops from the base of the conical spreader 10 and hence thorough mixture of the loose material with the fluid is insured.

The shaft 14 is rotatably mounted in appropriate bearings 18 and is provided with a drive pulley 19 much smaller than the pulley 13. A belt 20 connects this pulley 19 with a relatively large pulley 21 upon a vertical drive shaft 22, the upper end of the latter being provided with a small pulley 24 connected by a belt 25 with the pulley 13. The shaft 22 may be driven in any preferred manner and a belt pulley 26 is shown upon it for engagement with an appropriate driving belt. Driving of shaft 22 effects rotation of the two shafts 9 and 14, the spreader 10 carried by the shaft 9 and the spray head 15 carried by the shaft 14, and due to the sizes of driving pulleys employed, shaft 9 and spreader 10 rotate at a relatively low speed whereas shaft 14 and spray head 15 travel much more rapidly to insure centrifugal discharge of the molasses or the like regardless of how thick this fluid may be. The loose material from the chute 4, due to the provision of the spreader 10, falls in a curtain-like formation around the spray head 15, the latter being considerably smaller than said spreader so that none of the feed or other loose material can contact with said head and adhere thereto. The centrifugally discharged fluid from the head 15 is thrown against the descending "curtain" of loose material and hence thorough mixture is insured, final discharge taking place through the outlet 6.

Excellent results may be obtained from the details disclosed and they may therefore be followed if desired. However, the present disclosure is primarily for illustrative purposes and it is to be understood that the invention is not restricted to the particular details herein illustrated and described.

I claim:—

1. A mixing machine comprising a casing, an upper vertical shaft in said casing, a substantially conical spreader on the lower end of said upper shaft, a lower vertical shaft in said casing, the two shafts being axially alined and one of said shafts being tubular to conduct a fluid, a radially delivering spray head on the upper end of said lower shaft disposed under said spreader and of less diameter than the latter, said spray head receiving fluid from said tubular shaft, and a loose material inlet into said casing above said spreader.

2. A structure as specified in claim 1; together with means for rotating the upper and lower shafts at relatively low and high speed respectively.

3. A mixing machine comprising a vertical casing having a substantially conical upper end whose upper portion is provided with a loose-material inlet, a conical rotatable vertical-axis spreader for the loose material mounted within and co-axial with said conical casing end, said spreader being provided with pitched means on its periphery for feeding said material downwardly between said conical casing portion and the conical spreader, whereby said material will fall by gravity from said spreader in curtain form, a rotatable vertical-axis spray head under said spreader and of less diameter than the latter, and means for rotating said spreader and said spray head at relatively low and high speeds respectively.

In testimony whereof I affix my signature.

THOMAS E. FORSTER.